United States Patent
Li et al.

(10) Patent No.: US 12,146,050 B2
(45) Date of Patent: Nov. 19, 2024

(54) CORE-SHELL GRAFT COPOLYMERS WITH IMPROVED SURFACE PROPERTIES

(71) Applicant: SABIC GLOBAL TECHNOLOGIES B.V., Bergen op Zoom (NL)

(72) Inventors: Dejin Li, Newburgh, IN (US); Vern Lowry, Ottawa, IL (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/138,987

(22) Filed: Apr. 25, 2023

(65) Prior Publication Data

US 2023/0257575 A1  Aug. 17, 2023

Related U.S. Application Data

(63) Continuation of application No. 16/652,275, filed as application No. PCT/EP2018/081528 on Nov. 16, 2018, now Pat. No. 11,674,033.

(30) Foreign Application Priority Data

Nov. 16, 2017 (EP) ..................... 17201997

(51) Int. Cl.
*C08L 55/02* (2006.01)
*C08F 6/22* (2006.01)
*C25D 5/56* (2006.01)

(52) U.S. Cl.
CPC ................ *C08L 55/02* (2013.01); *C08F 6/22* (2013.01); *C25D 5/56* (2013.01)

(58) Field of Classification Search
CPC ............... C08L 55/02; C08F 6/22; C25D 5/56
See application file for complete search history.

(56) References Cited

U.S. PATENT DOCUMENTS 11,674,033 B2 * 6/2023 Li ........................... C08L 55/02
                                                                428/462
2020/0270445 A1   8/2020 Li et al.

FOREIGN PATENT DOCUMENTS

| EP | 2465883 A1 | 6/2012 | |
| JP | 2006-291051 A * | 10/2006 | ............. C08L 51/00 |
| WO | 2006127223 A1 | 11/2006 | |
| WO | WO 2012/080407 A1 * | 6/2012 | ............. C08L 33/20 |

OTHER PUBLICATIONS

International Search Report; International Application No. PCT/EP2018/081528; International Filing Date: Nov. 16, 2018; Date of Mailing: Feb. 14, 2019; 3 pages.
Written Opinion; International Application No. PCT/EP2018/081528; International Filing Date: Nov. 16, 2018; Date of Mailing: Feb. 14, 2019; 6 pages.

\* cited by examiner

*Primary Examiner* — Robert D Harlan
(74) *Attorney, Agent, or Firm* — CANTOR COLBURN LLP

(57) ABSTRACT

Disclosed herein is a core-shell graft copolymer produced by coagulation of an aqueous latex comprising a quantity of particles of the copolymer and a quantity of a fatty acid surfactant, wherein the coagulation involves the addition of a quantity of a multivalent metal salt, preferably a bivalent or trivalent metal salt. Such copolymer provides in an improvement of the surface properties of moulded articles produced from such copolymers, as demonstrated by a reduction of the content of gels in the surface layer.

20 Claims, No Drawings

CORE-SHELL GRAFT COPOLYMERS WITH IMPROVED SURFACE PROPERTIES

CROSS REFERENCE TO RELATED APPLICATIONS

This application is a is a continuation application of application Ser. No. 16/652,275, filed Mar. 30, 2020, which is a 371 of International Application No. PCT/EP2018/081528, filed Nov. 16, 2018, which claims priority to European Application Serial No. 17201997.8, filed Nov. 16, 2017, which are incorporated by reference in their entirety.

The present invention relates to core-shell graft copolymers having improved surface properties. In particular, the invention relates to core-shell graft copolymers having improved surface properties when coated with a metallic coating. The invention further relates to a process for producing such core-shell graft copolymers. The invention also related to articles comprising a surface area of such core-shell graft copolymer, in particular to articles comprising a surface area of such core-shell graft copolymer where the surface is coated with a metallic coating.

The external surface structure is considered an important characteristic for many different articles. Where articles or parts of articles are manufactured from polymeric materials, is tends to be particularly desired that the surfaces of such articles that are made up of those polymeric materials demonstrate a very low quantity of surface defects. This is certainly the case in the situation where such surface is covered with a metallic coating. In many articles, including for example household appliances and vehicle interior parts, the use of parts made from polymeric materials to which a metallic coating is applied is widespread. Such parts demonstrate the appearance of a metallic part, but still are for the main part produced from polymeric materials, and thus provide all the advantages of such polymeric materials, including for example weight reduction, the ability to produce wide varieties of complex shapes, and reduced cost of production.

One group of polymeric materials that are commonly used in articles with a metallic coating are core-shell graft copolymers. A particular example of suitable core-shell graft copolymers are copolymers comprising elastomeric cores structures to which a thermoplastic polymer is graft copolymerised. Such copolymers have good impact strength properties and good elastic modulus properties, whilst still having hardness properties such to allow the use in articles where a particular surface scratch resistance is required. As quality requirements continue to increase, there continues to be a need to have access to polymeric materials that, when shaped into a moulded part and provided with a metallic coating, demonstrate a uniform surface with as little as surface defects as possible.

WO 2012/080407 is directed to a thermoplastic polymer especially suitable for metal plating resulting in metal plated finished articles having improved resistance against repeated impacts, while maintaining sufficient thermal stability, surface quality, superior adhesion between the substrate and the metal layer irrespective of the complexity of the design of the molded article and the kind of metal plating technique (e.g. conventional, electroless, physical vapour deposition, direct metal plating). The thermoplastic moulding composition is produced from a graft copolymer (A) a thermoplastic polymer that has a moisture content of 0 to 27% by weight after work-up (B). Preferably, the composition additionally includes a thermoplastic polymer (C) that is not, or only to a limited amount, miscible with the thermoplastic polymer (B).

JP 2006291051 is directed to a thermoplastic resin composition. The thermoplastic resin composition comprises (B) a rubbery graft copolymer obtained by graft copolymerization of a vinyl monomer to a rubber in the presence of (A) a fatty acid-based surfactant wherein the counterion is sodium ion and coagulated with a calcium salt and (C) a polyacetal resin.

WO 2006/127223 is directed to a molding composition comprising an acrylic-styrene-acrylonitrile (ASA) resin comprising a discontinuous elastomeric phase dispersed in a rigid thermoplastic phase, wherein at least a portion of the rigid thermoplastic phase is grafted to the elastomeric phase; and wherein the thermoplastic phase comprises structural units derived from at least one vinyl aromatic monomer, at least one monoethylenically unsaturated nitrile monomers, and optionally at least one (C1-C12)alkyl- and aryl-(meth)acrylate monomer; and wherein the elastomeric phase is derived from a rubber substrate comprising structural units derived from at least one (C1-C12)alkyl(meth)acrylate monomer and at least one crosslinking agent comprising a polyethylenically unsaturated monomer; and wherein the rubber substrate comprises less than 5.6 micromoles of unreacted crosslinking agent per gram of rubber substrate based on the dry weight of the rubber substrate before grafting.

EP 2465883 is directed to an impact modifier in form of a core-shell copolymer impact modifier particle comprising a polymeric core and at least two polymeric layers, each layer with a different polymer composition, wherein at least one polymeric layer comprises a polymer that is a gradient polymer.

Further, improved requirements with regard to surface quality of articles made from polymeric materials continue to be requested also for applications besides articles with a metallic coating. The provision of materials allowing for production of articles with further reduced surface defects persists to be desired.

Disclosed herein is a core-shell graft copolymer produced by coagulation of an aqueous latex comprising a quantity of particles of the copolymer and a quantity of a fatty acid surfactant, wherein the coagulation involves the addition of a quantity of a multivalent metal salt, preferably a bivalent or trivalent metal salt, or a lithium salt.

Such copolymer provides an improvement of the surface properties of moulded articles produced from such copolymers, as demonstrated by a reduction of the content of gels in the surface layer.

The core-shell graft copolymer may for example comprise elastomeric core particles and thermoplastic polymeric chains. In the core-shell copolymer, it is preferred that at least a fraction of the thermoplastic polymeric chains is covalently bound to the elastomeric core particles to form a graft copolymer. The core-shell graft copolymer may for example comprise a quantity of elastomeric core particles onto which a fraction of thermoplastic polymeric chains is covalently bound, and a quantity of thermoplastic polymeric chains that are not covalently bound to elastomeric core particles.

The core-shell graft copolymer may for example comprise greater than or equal to (≥) 10.0 weight percent (wt %) of elastomeric core particles with regard to the total weight of the core-shell graft copolymer, preferably ≥20.0 wt %, more preferably ≥30.0 wt %, even more preferably ≥40.0 wt %.

The core-shell graft copolymer may for example comprise less than or equal to (≤) 80.0 wt % of elastomeric core particles, preferably ≤70.0 wt %, more preferably ≤60.0 wt %, even more preferably ≤50.0 wt %.

The core-shell graft copolymer may for example comprise ≥10.0 wt % and ≤80.0 wt % of elastomeric core particles, preferably ≥20.0 wt % and ≤70.0 wt %, more preferably ≥30.0 wt % and ≤60.0 wt %, even more preferably ≥40.0 wt % and ≤60.0 wt %.

The elastomeric core particles may for example have an average particle size of ≥100 nanometers (nm), preferably ≥150 nm, more preferably ≥200 nm, even more preferably ≥250 nm. The elastomeric core particles may for example have an average particle size of ≤1,000 nm, preferably ≤500 nm, more preferably ≤400 nm. The elastomeric core particles may for example have an average particle size of ≥100 nm and ≤1000 nm, preferably ≥150 nm and ≤500 nm, more preferably ≥200 nm and ≤400 nm.

As disclosed herein, the average particle size may be understood to be the $D_{50}$ particle size as determined in accordance with ISO 9276-2 (2014).

The elastomeric core particles may for example be polymers produced using compounds comprising at least 2 unsaturated carbon-carbon bonds as monomers, or polymers produced using compounds comprising one or more acrylate moieties as monomers, or combinations of such polymers.

Examples of compounds comprising at least 2 unsaturated carbon-carbon bonds include for example butadiene, isoprene, chloroprene, 2-methyl-1,3-butadiene, 2,3-dimethyl-1,3-butadiene, 1,2-propadiene, 1,4-pentadiene, 1,2-pentadiene, 1,5-hexadiene, or combinations thereof. It is preferred that the compound comprising at least 2 unsaturated carbon-carbon bonds is butadiene.

Examples of polymers produced using compounds comprising at least 2 unsaturated carbon-carbon bonds as monomers include for example polybutadiene, polyisoprene, poly(styrene-butadiene), poly(acrylonitrile-styrene), poly(styrene-isoprene), poly(isoprene-butadiene), or combinations thereof. It is preferred that the polymer obtained from compounds comprising at least 2 unsaturated carbon-carbon bonds is polybutadiene.

Examples of compounds comprising one or more acrylate moieties include for example methyl acrylate, ethyl acrylate, butyl acrylate, 2-ethylhexyl acrylate, cyclohexyl acrylate, benzyl acrylate, isopropyl acrylate, methyl methacrylate, ethyl methacrylate, butyl methacrylate, isopropyl methacrylate, cyclohexyl methacrylate, or combinations thereof. It is preferred that the compound comprising one or more acrylate moieties is butyl acrylate.

Examples of polymers produced using compounds comprising one or more acrylate moieties as monomers include for example ethylene acrylic elastomers and poly(n-butyl acrylate). The polymer produced using compounds comprising one or more acrylate moieties as monomers can be poly(n-butyl acrylate).

It is preferred that the elastomeric core particles are selected from polybutadiene particles, polyacrylate particles such as polybutylacrylate particles, or poly(styrene-butadiene) particles.

The core-shell graft copolymer may for example be produced by polymerisation of the elastomeric core particles with a quantity of one or more monomer(s). The monomer(s) may for example be one or more of styrene, alpha-methyl styrene, vinyl toluene, vinyl chlorobenzene, vinyl bromobenzene, acrylonitrile, methacrylonitrile, methyl methacrylate, methyl acrylate, ethyl methacrylate, ethyl acrylate, butyl acrylate, maleic anhydride, or N-phenylmaleimide.

The core-shell graft copolymer may for example comprise ≥5.0 wt % of polymeric chains graft copolymerised onto the elastomeric core particles, with regard to the total weight of the core-shell graft copolymer, preferably ≥10.0 wt %, more preferably ≥15.0 wt %.

The core-shell graft copolymer may for example comprise ≤50.0 wt % of polymeric chains graft copolymerised onto the elastomeric core particles, with regard to the total weight of the core-shell graft copolymer, preferably ≤40.0 wt %, more preferably ≤30.0 wt %, even more preferably ≤20.0 wt %.

The core-shell graft copolymer may for example comprise ≥5.0 wt % and ≤50.0 wt % of polymeric chains graft copolymerised onto the elastomeric core particles, with regard to the total weight of the core-shell graft copolymer, preferably ≥5.0 wt % and ≤30 wt %, more preferably ≥10.0 wt % and ≤20.0 wt %.

The core-shell graft copolymer may for example comprise ≥20.0 wt % of polymeric chains that are not covalently bound the elastomeric core particles, with regard to the total weight of the core-shell graft copolymer, preferably ≥30.0 wt %, more preferably ≥40.0 wt %. The core-shell graft copolymer may for example comprise ≤75.0 wt % of polymeric chains that are not covalently bound to the elastomeric core particles, with regard to the total weight of the core-shell graft copolymer, preferably ≤65.0 wt %, more preferably ≤55.0 wt %. The core-shell graft copolymer may for example comprise ≥20.0 wt % and ≤75.0 wt % of polymeric chains that are not covalently bound to the elastomeric core particles, with regard to the total weight of the core-shell graft copolymer, preferably ≥30.0 wt % and ≤65.0 wt %, more preferably ≥40.0 wt % and ≤55.0 wt %.

The polymeric chains that are graft copolymerised onto the elastomeric core particles may for example be polymeric chains derived from one or more monomers selected from vinyl aromatic compounds, vinyl cyanide compounds, or compounds comprising one or more acrylate moieties.

The polymeric chains that are not covalently bound to the elastomeric core particles may for example be polymeric chains derived from one or more monomers selected from vinyl aromatic compounds, vinyl cyanide compounds, or compounds comprising one or more acrylate moieties.

The polymeric chains that are graft copolymerised onto the elastomeric core particles and the polymeric chains that are not covalently bound to the elastomeric core particles may for example be derived from the same monomer(s). Alternatively, the polymeric chains that are graft copolymerised onto the elastomeric core particles and the polymeric chains that are not covalently bound to the elastomeric core particles may for example be derived from different monomer(s). Preferably, the polymeric chains that are graft copolymerised onto the elastomeric core particles and the polymeric chains that are not covalently bound to the elastomeric core particles are derived from the same monomer(s).

Examples of vinyl aromatic compounds include for example styrene, α-methyl styrene, halostyrenes such as dibromostyrene, vinyltoluene, vinylxylene, butylstyrene, p-hydroxystyrene, methoxystyrene, or combinations thereof. Particularly the vinyl aromatic compounds can include, for example styrene and α-methyl styrene. It is preferred that the vinyl aromatic compound is styrene.

Examples of vinyl cyanide compounds include for example acrylonitrile, methacrylonitrile, ethacrylonitrile, α-chloroacrylonitrile, α-bromoacrylonitrile, or combinations thereof. It is preferred that the vinyl cyanide compound is acrylonitrile.

Examples of compounds comprising one or more acrylate moieties include for example methyl acrylate, ethyl acrylate, butyl acrylate, 2-ethylhexyl acrylate, cyclohexyl acrylate, benzyl acrylate, isopropyl acrylate, methyl methacrylate, ethyl methacrylate, butyl methacrylate, isopropyl methacrylate, cyclohexyl methacrylate, or combinations thereof. Particularly, the compound comprising one or more acrylate moieties may be selected from methyl acrylate or methyl methacrylate.

Preferably, the polymeric chains that are graft copolymerised onto the elastomeric core particles and the polymeric chains that are not covalently bound to the elastomeric core particles are derived from one or more monomer(s) selected from acrylonitrile, styrene, α-methyl styrene, or methyl methacrylate. It is particularly preferred that the polymeric chains that are graft copolymerised onto the elastomeric core particles and the polymeric chains that are not covalently bound to the elastomeric core particles are derived from acrylonitrile and styrene. The polymeric chains may for example be produced using a reaction mixture comprising styrene and acrylonitrile wherein the molar ratio of styrene to acrylonitrile is in the range of 1.5-4.0.

For example, the core-shell graft copolymer may be produced using a reaction mixture comprising elastomeric core particles and one or more monomer(s) selected from acrylonitrile, styrene, α-methyl styrene, or methyl methacrylate. The molar ratio of the elastomeric core particles to the total of the monomer(s) may for example be in the range of 0.1-3.0, preferably in the range of 0.2-2.0.

The core-shell graft copolymer can be produced using a reaction mixture comprising elastomeric core particles and a mixture of monomers comprising acrylonitrile and styrene. It is particularly preferred that the core-shell graft copolymer is produced using a reaction mixture comprising elastomeric core particles and a mixture of monomers consisting of acrylonitrile and styrene. Even further, it is preferred that the core-shell graft copolymer is produced using a reaction mixture comprising elastomeric core particles wherein the elastomeric core particles are at least one of polybutadiene particles, poly(n-butyl)acrylate particles, or poly(styrene-butadiene) particles, and a mixture of monomers comprising acrylonitrile and styrene. Even further preferably, the core-shell graft copolymer is produced using a reaction mixture comprising elastomeric core particles wherein the elastomeric core particles are polybutadiene particles, and a mixture of monomers comprising acrylonitrile and styrene.

The elastomeric core particles can be with at least two distinguishable peaks on particle size distribution, which is determined by a Beckman Coulter multi-wavelength laser diffraction particle size analyser type LS 13320 in accordance with ISO 13320. The first peak is at <200 nanometers (nm). The second peak is at 200-500 nm. A possible third peak can be at >800 nm with >0.1% volume percentage. Such particle size distribution elastomeric core particles can be produced by processing the monodistributed particles latex through high pressure mechanical homogenizer. Hence, the elastomeric core particles can be trimodal.

Optionally, the core-shell graft copolymer can be produced using a reaction mixture comprising elastomeric core particles wherein the elastomeric core particles are polybutadiene particles, and a mixture of monomers comprising acrylonitrile and styrene, wherein the molar ratio of styrene to acrylonitrile is in the range of 1.5-4.0, preferably 2.0-3.0, and the molar ratio of polybutadiene to the sum of styrene and acrylonitrile is in the range of 0.1-3.0, preferably 0.2-2.0.

For example, the core-shell graft copolymer may be an acrylonitrile-butadiene-styrene (ABS) graft copolymer, a methyl methacrylate-butadiene-styrene graft copolymer, or an acrylonitrile-styrene-acrylate rubber graft copolymer. In a preferred embodiment, the core-shell graft copolymer is an acrylonitrile-butadiene-styrene graft copolymer.

The core-shell graft copolymer may for example have an average particle size $D_{50}$ of ≥0.02 micrometer (μm), preferably ≥0.05 μm, more preferably ≥0.10 μm. The core-shell graft copolymer may for example have an average particle size $D_{50}$ of ≤3.00 μm, preferably ≤2.00 μm, more preferably ≤1.00 μm. The core-shell graft copolymer may for example have an average particle size $D_{50}$ of ≥0.02 μm and ≤3.00 μm, preferably ≥0.05 μm and ≤2.00 μm, more preferably ≥0.10 μm and ≤1.00 μm.

The aqueous latex comprises a quantity of particles of the core-shell graft copolymer. The aqueous latex may for example comprise ≥10.0 wt % of particles of the core-shell graft copolymer with regard to the total weight of the aqueous latex, preferably ≥20.0 wt %, more preferably ≥30.0 wt %. The aqueous latex may for example comprise ≤70.0 wt % of the core-shell graft copolymer with regard to the total weight of the aqueous latex, preferably ≤60.0 wt %, more preferably ≤50.0 wt %, still more preferably less than (<) 40.0 wt %, or ≤35.0 wt %. The aqueous latex may for example comprise ≥10 wt % and ≤70.0 wt % of the core-shell graft copolymer with regard to the total weight of the aqueous latex, preferably ≥20.0 wt % and ≤60.0 wt %, more preferably ≥30.0 wt % and ≤50.0 wt %. Preferably the aqueous latex can comprise ≥10.0 wt % and ≤40 wt % particles of the core-shell graft copolymer with regard to the total weight of the aqueous latex, more preferably ≥20.0 wt % and ≤35.0 wt %, or ≥25.0 wt % and ≤35.0 wt %. For example, if the core-shell copolymer contains more than 40 wt % butadiene rubber, it may cause rubber agglomeration in the compounding step due to less surface coverage of SAN to the rubber core. This can result more defects in the final article surface after processing to make the metallic coating.

The aqueous latex comprising the core-shell graft copolymer can further comprise a quantity of a surfactant. For example, the aqueous latex may comprise 0.1-5.0 wt % of surfactant, with regard to the total weight of the aqueous latex, preferably 0.5-3.0 wt %.

The surfactant may for example be a fatty acid or a salt thereof, or a mixture of fatty acids or salts thereof. The fatty acid salt may be a potassium salt, a magnesium salt, a sodium salt, or a calcium salt. Preferably, the fatty acid salt is a potassium salt.

The fatty acid may be a single compound or a mixture of fatty acids. The fatty acid may be a saturated fatty acid, a monounsaturated fatty acid, a polyunsaturated fatty acid, or mixtures thereof. The fatty acid may for example be selected from dodecanoic acid, tetradecanoic acid, hexadecanoic acid, octadecanoic acid, eicosanoic acid, docosanoic acid, dodecenoic acid, tetradecenoic acid, hexadecenoic acid, octadecenoic acid, eicosenoic acid, docosenoic acid, dodecadienoic acid, tetradecadienoic acid, hexadecadienoic acid, octadecadienoic acid, eicosadienoic acid, docosadienoic acid, and mixtures of such compounds.

For example, the surfactant may be tallow fatty acid or tallow fatty acid potassium salt. Preferably, the surfactant is tallow fatty acid potassium salt.

The surfactant may for example be selected from fatty acids comprising ≥14 and ≤20 carbon atoms, preferably comprising ≤5 unsaturations, or mixtures thereof.

The core-shell graft copolymer disclosed herein can be produced by coagulation of an aqueous latex comprising a quantity of particles of the copolymer and a quantity of a surfactant, wherein the coagulation involves the addition of a quantity of a multivalent metal salt, preferably a bivalent or trivalent metal salt. For example, the multivalent metal salt may be a bivalent metal salt.

The multivalent metal salt may for example be a salt of beryllium, magnesium, calcium, strontium, barium, radium, aluminium or zinc. Preferably, the multivalent metal salt is a salt of magnesium, aluminium, zinc, or calcium. More preferably, the multivalent metal salt is a calcium salt.

The multivalent metal salt may for example be a halogenide (preferably a chloride), a sulphate, a biphosphate, a hydrogen phosphate, a bisulphate, a bicarbonate, a chlorate, or a nitrate. Preferably, the multivalent metal salt is a metal halogenide, for example a metal chloride.

The multivalent metal salt may for example be a salt of an alkaline earth metal.

For example, the multivalent metal salt may be selected from magnesium sulphate, magnesium chloride, magnesium nitrate, calcium chloride, calcium nitrate, aluminium chloride, aluminium nitrate, zinc chloride, zinc sulphate, and zinc nitrate. Preferably, the multivalent metal salt is calcium chloride.

A quantity of for example 0.5-2.5 wt %, preferably 1.0-2.0 wt %, of the multivalent metal salt may be added for coagulation to the aqueous latex, with regard to the total weight of the aqueous latex. For example, a quantity of 0.5-2.5 wt %, preferably 1.0-2.0 wt %, of the multivalent metal salt may be added for coagulation to the aqueous latex, with regard to the total weight of the aqueous latex, wherein the multivalent metal salt is selected from magnesium sulphate, magnesium chloride, magnesium nitrate, calcium chloride, calcium nitrate, aluminium chloride, aluminium nitrate, zinc chloride, zinc sulphate and zinc nitrate. Preferably, a quantity of 0.5-2.5 wt %, preferably 1.0-2.0 wt %, of the multivalent metal salt is added for coagulation to the aqueous latex, with regard to the total weight of the aqueous latex, wherein the multivalent metal salt is calcium chloride.

Also disclosed herein is a process for the production of a core-shell graft copolymer comprising coagulation of an aqueous latex comprising a quantity of particles of the copolymer and a quantity of a fatty acid surfactant, wherein the coagulation involves the addition of 0.5-2.5 wt % of a multivalent metal salt with regard to the weight of the core-shell copolymer particles present in the latex.

In this process, the metal may for example be selected from beryllium, magnesium, calcium, strontium, barium, radium, aluminium and zinc, and is preferably magnesium, aluminium, zinc and calcium; and/or the salt may be a halogenide, preferably a chloride, a sulphate, a biphosphate, a hydrogen phosphate, a bisulphate, a bisulphite, a bicarbonate, a chlorate, or a nitrate.

In this process, the core-shell graft copolymer may for example be one selected from an acrylonitrile-butadiene-styrene graft copolymer, a methyl methacrylate-butadiene-styrene graft copolymer, an acrylonitrile-styrene-acrylate rubber graft copolymer, and an acrylonitrile-styrene-silicone rubber graft copolymer, and the multivalent metal salt may be one selected from magnesium sulphate, magnesium chloride, magnesium nitrate, calcium chloride, calcium nitrate, aluminium chloride, aluminium nitrate, zinc chloride, zinc sulphate, and zinc nitrate.

Further disclosed herein are articles comprising a surface area comprising a core-shell graft copolymer. In particular, the invention relates to articles wherein said surface area is coated with a metallic coating. For example, such metallic coating may be applied via electroplating. In certain preferred embodiments the metallic coating is selected from copper, nickel, gold, silver, platinum, or alloys thereof.

A core-shell graft copolymer can be produced by coagulation of an aqueous latex comprising a quantity of particles of the copolymer and a quantity of a surfactant, wherein the coagulation involves the addition of a quantity of a multivalent metal salt, preferably a bivalent or trivalent metal salt, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains.

A core-shell graft copolymer can be produced by coagulation of an aqueous latex comprising a quantity of particles of the copolymer and a quantity of a surfactant, wherein the coagulation involves the addition of a quantity of a multivalent metal salt, wherein the multivalent metal salt is calcium chloride, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains.

A core-shell graft copolymer can be produced by coagulation of an aqueous latex comprising a quantity of particles of the copolymer and a quantity of a surfactant, the surfactant being a fatty acid or salt thereof or a mixture of fatty acids or salts thereof, wherein the coagulation involves the addition of a quantity of a multivalent metal salt, wherein the multivalent metal salt is calcium chloride, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains.

A core-shell graft copolymer can be produced by coagulation of an aqueous latex comprising a quantity of particles of the copolymer and a quantity of a surfactant, the surfactant being a fatty acid or salt thereof or a mixture of fatty acids or salts thereof, wherein the coagulation involves the addition of a quantity of a multivalent metal salt, wherein the multivalent metal salt is calcium chloride, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains, and wherein multivalent metal salt is added to the aqueous latex in a quantity of 0.5-2.5 wt % with regard to the total weight of the core-shell graft copolymer particles present in the latex.

A core-shell graft copolymer can be produced by coagulation of an aqueous latex comprising a quantity of particles of the copolymer and a quantity of a surfactant, the surfactant being a fatty acid or salt thereof or a mixture of fatty acids or salts thereof, wherein the coagulation involves the addition of a quantity of a multivalent metal salt, wherein the multivalent metal salt is calcium chloride, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains, wherein multivalent metal salt is added to the aqueous latex in a quantity of 0.5-2.5 wt % with regard to the total weight of the core-shell graft copolymer particles present in the latex, wherein the copolymer particles in the aqueous latex have an average particle diameter $D_{50}$ of ≥0.02 μm and ≤3.00 μm.

A core-shell graft copolymer can be produced by coagulation of an aqueous latex comprising a quantity of particles of the copolymer and a quantity of a surfactant, the surfactant being a fatty acid or salt thereof or a mixture of fatty acids or salts thereof, wherein the coagulation involves the addition of a quantity of a multivalent metal salt, wherein the multivalent metal salt is calcium chloride, wherein the core-shell graft copolymer comprises a quantity of elastomeric core particles onto which a fraction of thermoplastic polymer chains is covalently bound, and a quantity of thermoplastic polymer chains that are not covalently bound to the elastomeric core particles, wherein the elastomeric core particles are polybutadiene particles, and the thermoplastic polymer chains are poly(styrene-acrylonitrile) chains, wherein multivalent metal salt is added to the aqueous latex in a quantity of 0.5-2.5 wt % with regard to the total weight of the core-shell graft copolymer particles present in the latex, wherein the copolymer particles in the aqueous latex have an average particle diameter $D_{50}$ of ≥0.02 μm and ≤3.00 μm, wherein the fatty acid comprises ≥14 and ≤20 carbon atoms, and comprises ≤5 unsaturations.

The invention will now be illustrated by the following non-limiting examples.

Coagulation of Polymer Latex

An aqueous latex comprising a quantity of an acrylonitrile-butadiene-styrene (ABS) graft copolymer was subjected to a series of coagulation experiments. The ABS latex was obtained from an emulsion polymerisation process. The latex comprised 40.0 wt % solid matter, the solid matter consisting of 97.7 wt % ABS, and 2.3 wt % tallow fatty acid potassium salt, with regard to the total weight of the solid matter. The ABS comprised 32.1 wt % of polybutadiene, 45.6 wt % of moieties derived from styrene, and 22.3 wt % of moieties derived from acrylonitrile, with regard to the total weight of the ABS copolymer. The average particle size of the ABS copolymer in the latex was in the range of 0.05-0.50 μm.

In each of Experiments 1-4, a quantity of 42 liters (l) of the latex was added gradually over a period of 30 minutes (min) to a batch coagulator vessel containing 50 l of water under stirring, where the vessel was subjected to heating such that after 6 min the temperature reached 79° C., after 12 min the temperature reached 82° C., and after 30 min, so when addition of the latex was completed, the temperature reached 85° C. The temperature was further increased to 90° C. At that point a quantity of coagulant was added as per Table I below:

TABLE I

| Coagulant formulations | | | | |
|---|---|---|---|---|
| Experiment | 1 (C) | 2 | 3 | 4 |
| Coagulant | $H_2SO_4$ | $CaCl_2$ | $CaCl_2$ | $CaCl_2$ |
| Quantity of coagulant | 1.5 | 1.0 | 2.0 | 3.0 |

The $H_2SO_4$ used in the Experiment 1 was 98% $H_2SO_4$. The quantity of coagulant is presented as parts by weight per 100 parts by weight of solid matter in the latex.

The mixture was maintained at 90° C. for 10 minutes under stirring, after which a quantity of 150 l water was added to the vessel to cool down the contents of the vessel to below 38° C.

Then, the coagulator vessel contents were transferred to a centrifuge and centrifuged to remove the water so that a wet cake having a moisture content of circa (ca.) 50 wt % was obtained. The wet cake was collected and fed back to the empty coagulator vessel together with 75 l of water of 50° C. After 10 minutes, another 125 l of water were added of such temperature to cool the contents of the vessel to below contents of the vessel to below 38° C. The coagulator vessel contents were transferred to the centrifuge and centrifuged for 10 minutes to obtain a wet cake having a moisture content of ca. 35 wt %. The obtained wet cake was subjected to air drying at a temperature of 71° C. until it contained ≤0.2 wt % of moisture. ABS Samples 1 through 4 were so obtained.

The obtained ABS samples were melt compounded with additives in a 7-zone 30 mm twin-screw melt extruder according to the formulations in Table II:

TABLE II

| Compounding formulations | | | | |
|---|---|---|---|---|
| Sample | 1 (C) | 2 | 3 | 4 |
| ABS | 100.0 | 100.0 | 100.0 | 100.0 |
| MgO | 0.25 | — | — | — |
| EBS wax | 0.50 | 0.50 | 0.50 | 0.50 |
| PEE | 0.50 | 0.50 | 0.50 | 0.50 |
| Phosphite | 0.50 | 0.50 | 0.50 | 0.50 |

Wherein:
MgO is magnesium oxide, to neutralize the sulphuric acid, CAS reg. nr. 1309-48-4;
EBS wax is ethylene-bis-stearamide wax, CAS reg. nr. 110-30-5;
PEE is polyoxyethylene ether having Mw or 8800, CAS reg. nr. 9003-11-6; and
Phosphite is Ultranox 626, bis(2,4-di-tert-butylphenyl) pentaerythritol diphosphite, CAS reg. nr. 4122-20-3.

The melt extruder was operated at a speed of 250 revolutions per minute (rpm). The temperature settings of the melt extruder for each of the four exemplary grades are indicated in Table III:

TABLE III

| Compounding extruder settings | | | | | | | |
|---|---|---|---|---|---|---|---|
| Zone | 1 | 2 | 3 | 4 | 5 | 6 | 7 |
| Temperature (° C.) | 180 | 200 | 210 | 220 | 220 | 230 | 230 |

The product obtained from the compounding extruder was solidified and cut to pellets. From the pellets of each of Samples 1-4, films were produced using a 2.5 centimeter (cm) Sterling sheet extruder operated under the conditions as set out in Table IV:

TABLE IV

| Film extruder settings | | | | | |
|---|---|---|---|---|---|
| Zone | 1 | 2 | 3 | 4 | Die |
| Temperature (° C.) | 227 | 238 | 154 | 249 | 249 |
| Screw speed | 20 rpm | | Pressure | 203 kPa | |
| Roll speed | 2.3 m/min | | Roll temp | 82° C. | |

For each of Samples 1-4, films were obtained of 11.4 cm width, 75 μm thickness, and 53 meter (m) length.

Determination of Film Properties

The films produced from the copolymer Samples 1-4 were tested to detect the quantity of gels. In this context, gels are to be understood as areas of undispersed materials protruding from the surface of the film for more than 20 μm. The determination of the gel content was performed using a sheet profilometer equipped with five 1.27 cm wide linear variable displacement transducer sensors. The sample films were conveyed along the sensors at a constant speed of 2.44 centimeter per second (cm/s). The gels were recorded as peaks recorded by the displacement sensors. For each sample, the quantity of peaks, and thus the quantity of gels, was counted for a 10-minute test run, equalling a length of 14.6 m of film length.

Further, the quantity of residual calcium in the films were determined in accordance with ASTM $D_{7876}$ (2013). The results are in Table V.

TABLE V

| Sample | 1 (C) | 2 | 3 | 4 |
|---|---|---|---|---|
| Gel count | 379 | 180 | 92 | 78 |
| Residual Ca | 0 | 1430 | 1440 | 1560 |

The objective to reduce gels is achieved by each of the Samples 2-4, in which the coagulant was a multivalent metal salt, over sample 1, wherein the coagulant was an acid that was subsequently neutralized during the compounding with a metal oxide MgO. Films of Samples 2 and 3 demonstrate a particular desirable balance of low gel count at low metal salt quantities added, which is desirable since this positively impacts process economics as well as residual metal content in the copolymer material. The presence of a low residual metal content is desirable as a too high content is understood to attribute to the occurrence of surface defects.

Set forth below are some aspects of the copolymer disclosed herein.

Aspect 1: A core-shell graft copolymer, preferably a core-shell acrylonitrile-butadiene-styrene graft copolymer, produced by coagulation of an aqueous latex comprising ≥10.0 wt % and <40 wt % of particles of the copolymer and a quantity of a surfactant, wherein the coagulation involves the addition of a quantity of a lithium salt or a multivalent metal salt, preferably a bivalent or trivalent metal salt.

Aspect 2: The core-shell graft copolymer according to Aspect 1, wherein the core-shell graft copolymer is an acrylonitrile-butadiene-styrene graft copolymer, a methyl methacrylate-butadiene-styrene graft copolymer, or an acrylonitrile-styrene-acrylate rubber graft copolymer; preferably the core-shell graft copolymer is an acrylonitrile-butadiene-styrene graft copolymer.

Aspect 3: The core-shell graft copolymer according to any one of Aspects 1-2, wherein the surfactant is a fatty acid or a salt thereof, or a mixture of fatty acids or salts thereof.

Aspect 4: The core-shell graft copolymer according to any one of Aspects 1-3, wherein the metal is selected from beryllium, magnesium, calcium, strontium, barium, radium, aluminium and zinc, and is preferably magnesium, aluminium, zinc or calcium.

Aspect 5: The core-shell graft copolymer according to any one of Aspects 1-4, wherein the salt is a halogenide, preferably a chloride, a sulphate, a biphosphate, a hydrogen phosphate, a bisulphate, a bisulphite, a bicarbonate, a chlorate, or a nitrate.

Aspect 6: The core-shell graft copolymer according to any one of Aspects 1-5, wherein the multivalent metal salt or lithium salt is selected from magnesium sulphate, magnesium chloride, magnesium nitrate, calcium chloride, calcium nitrate, aluminium chloride, aluminium nitrate, zinc chloride, zinc sulphate, zinc nitrate, lithium chloride, lithium nitrate, or lithium sulphate; preferably the coagulation involves at least one of lithium chloride, lithium nitrate, or lithium sulphate.

Aspect 7: The core-shell graft copolymer according to any one of Aspects 1-6, wherein the multivalent metal salt is a salt of an alkaline earth metal.

Aspect 8: The core-shell graft copolymer according any one of Aspects 1-7, wherein the multivalent metal salt is added to the latex for coagulation in a quantity of 0.5-2.5 wt % with regard to the weight of the core-shell graft copolymer particles present in the latex.

Aspect 9: The core-shell graft copolymer according any one of Aspects 1-8, wherein the coagulation of the aqueous latex is free of magnesium oxide.

Aspect 10: The core-shell graft copolymer according any one of Aspect 1-9, wherein the copolymer comprises elastomeric core particles, wherein the elastomeric core particles are trimodal, preferably, wherein the elastomeric core particles have a first peak at <200 nm, a second peak at 200-500 nm, and a third peak at ≥800 nm.

Aspect 11: A process for the production of a core-shell graft copolymer comprising coagulation of an aqueous latex comprising a quantity of particles of the copolymer and a quantity of a fatty acid surfactant, wherein the coagulation involves the addition of 0.5-2.5 wt % of a multivalent metal salt with regard to the weight of the core-shell copolymer particles present in the latex.

Aspect 12: The process according to Aspect 11, wherein: the metal comprises at least one selected from beryllium, magnesium, calcium, strontium, barium, radium, aluminium, or zinc.

Aspect 13: The process according to any one of Aspect 11-12, wherein: the metal comprises at least one selected from magnesium, aluminium, zinc, or calcium.

Aspect 14: The process according to Aspect 11-13, wherein: the salt comprises at least one of a halogenide, a sulphate, a biphosphate, a hydrogen phosphate, a bisulphate, a bisulphite, a bicarbonate, a chlorate, or a nitrate; preferably the salt comprises a halogenide; more preferably the salt comprises chloride.

Aspect 15: The process according to any one of Aspects 11-14, wherein the multivalent metal salt comprises at least one (preferably one) selected from magnesium sulphate, magnesium chloride, magnesium nitrate, calcium chloride, calcium nitrate, aluminium chloride, aluminium nitrate, zinc chloride, zinc sulphate, or zinc nitrate; preferably wherein the multivalent metal salt comprises calcium chloride.

Aspect 16: The process according to any one of Aspects 11-15, wherein the core-shell graft copolymer comprises at least one (preferably one) selected from an acrylonitrile-butadiene-styrene graft copolymer, a methyl methacrylate-butadiene-styrene graft copolymer, an acrylonitrile-styrene-acrylate rubber graft copolymer, or an acrylonitrile-styrene-silicone rubber graft copolymer.

Aspect 17: An article comprising a surface area comprising a core-shell graft copolymer according to any one of Aspects 1-10 or of a core-shell graft copolymer obtained by the process of any one of Aspects 11-16.

Aspect 18: The article according to Aspect 17, wherein the surface area comprising the core-shell graft copolymer is coated with a metallic coating; preferably the whole surface area is coated with the metallic coating.

Aspect 19: The article according to Aspect 18, wherein the metallic coating is applied to the article by means of electroplating.

Aspect 20: The article according to any one of Aspects 17-19, wherein the metallic coating comprises at least one selected from copper, nickel, gold, silver, platinum, or alloys thereof.

The terms "a" and "an" and "the" do not denote a limitation of quantity, and are to be construed to cover both the singular and the plural, unless otherwise indicated herein or clearly contradicted by context. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like. "One or more of the foregoing" means at least one of the listed material. All amounts total 100 wt %. All ranges disclosed herein are inclusive of the endpoints, and the endpoints are independently combinable with each other. In general, the disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

Unless specified to the contrary herein, all test standards are the most recent standard in effect as of the filing date of this application, or, if priority is claimed, the filing date of the earliest priority application in which the test standard appears. All cited patents, patent applications (including any priority application), and other references are incorporated herein by reference in their entirety. However, if a term in the present application contradicts or conflicts with a term in the incorporated reference, the term from the present application takes precedence over the conflicting term from the incorporated reference.

The invention claimed is:

1. A core-shell graft copolymer, produced by coagulation of an aqueous latex comprising ≥10.0 wt % and <40 wt % of particles of the copolymer and a quantity of a surfactant, wherein the coagulation involves the addition of a quantity of a lithium salt or a multivalent metal salt;
    wherein the multivalent metal salt is added to the latex for coagulation in a quantity of 0.5-2.5 wt % with regard to the weight of the core-shell graft copolymer particles present in the latex; and the core-shell graft copolymer comprises elastomeric core particles and thermoplastic polymer chains, ≥5.0 wt % and ≤30 wt % of the thermoplastic polymeric chains are covalently bound onto the elastomeric core particles, and ≥30.0 wt % and ≤65.0 wt % of the thermoplastic polymeric chains are not covalently bound to the elastomeric core particles, with respect to the total weight of the core-shell graft copolymer.

2. The core-shell graft copolymer according to claim 1, wherein the core-shell graft copolymer is an acrylonitrile-butadiene-styrene graft copolymer, a methyl methacrylate-butadiene-styrene graft copolymer, or an acrylonitrile-styrene-acrylate rubber graft copolymer.

3. The core-shell graft copolymer according to claim 1, wherein the core-shell graft copolymer is an acrylonitrile-butadiene-styrene graft copolymer.

4. The core-shell graft copolymer according to claim 1, wherein the surfactant is a fatty acid or a salt thereof, or a mixture of fatty acids or salts thereof.

5. The core-shell graft copolymer according to claim 1, wherein the metal comprises at least one selected from beryllium, magnesium, calcium, strontium, barium, radium, aluminium, or zinc.

6. The core-shell graft copolymer according to claim 1, wherein the salt is a halogenide.

7. The core-shell graft copolymer according to claim 1, wherein the multivalent metal salt or lithium salt is selected from at least one magnesium chloride, magnesium nitrate, calcium chloride, calcium nitrate, aluminium chloride, aluminium nitrate, zinc chloride, zinc nitrate, lithium chloride, lithium nitrate, or lithium sulphate.

8. The core-shell graft copolymer according to claim 1, wherein the multivalent metal salt is a salt of an alkaline earth metal.

9. The core-shell graft copolymer according claim 1, wherein the multivalent metal salt is added to the latex for coagulation in a quantity of 1.0-2.0 wt % with regard to the weight of the core-shell graft copolymer particles present in the latex.

10. The core-shell graft copolymer according to claim 1, wherein the coagulation of the aqueous latex is free of magnesium oxide.

11. A process for the production of a core-shell graft copolymer comprising coagulation of an aqueous latex comprising a quantity of particles of the copolymer and a quantity of a fatty acid surfactant, wherein the coagulation involves the addition of 0.5-2.5 wt % of a multivalent metal salt with regard to the weight of the core-shell copolymer particles present in the latex wherein the salt is a halogenide, a biphosphate, a hydrogen phosphate, a bicarbonate, a chlorate, or a nitrate, wherein the core-shell graft copolymer comprises elastomeric core particles and thermoplastic polymeric chains, ≥5.0 wt % and ≤30 wt % of the thermoplastic polymeric chains are covalently bound onto the elastomeric core particles, and ≥30.0 wt % and ≤65.0 wt % of the thermoplastic polymeric chains are not covalently bound to the elastomeric core particles, with respect to the total weight of the core-shell graft copolymer.

12. The process according claim 11, wherein the multivalent metal salt is added to the latex for coagulation in a quantity of 1.0-2.0 wt % with regard to the weight of the core-shell graft copolymer particles present in the latex.

13. The process according to claim 11, wherein:
    the metal comprises at least one selected from beryllium, magnesium, calcium, strontium, barium, radium, aluminium, or zinc; and/or
    the salt comprises a chloride.

14. The process according to claim 13, wherein the core-shell graft copolymer comprises at least one selected from an acrylonitrile-butadiene-styrene graft copolymer, a methyl methacrylate-butadiene-styrene graft copolymer, an acrylonitrile-styrene-acrylate rubber graft copolymer, and an acrylonitrile-styrene-silicone rubber graft copolymer, and wherein the multivalent metal salt comprises at least one selected from magnesium chloride, magnesium nitrate, calcium chloride, calcium nitrate, aluminium chloride, aluminium nitrate, zinc chloride, and zinc nitrate.

15. The process according to claim 11, wherein the core-shell graft copolymer comprises at least one selected from an acrylonitrile-butadiene-styrene graft copolymer, a methyl methacrylate-butadiene-styrene graft copolymer, an acrylonitrile-styrene-acrylate rubber graft copolymer, and an acrylonitrile-styrene-silicone rubber graft copolymer, and wherein the multivalent metal salt comprises at least one selected from magnesium chloride, magnesium nitrate, calcium chloride, calcium nitrate, aluminium chloride, aluminium nitrate, zinc chloride, and zinc nitrate.

16. An article comprising a surface area comprising a core-shell graft copolymer according to claim 1.

17. The article according to claim 16, wherein the surface area comprising the core-shell graft copolymer is coated with a metallic coating.

18. An article comprising a surface area comprising a core-shell graft copolymer obtained by the process of claim 11.

19. A core-shell graft copolymer, produced by coagulation of an aqueous latex comprising ≥10.0 wt % and <40 wt % of particles of the copolymer and a quantity of a surfactant, wherein the coagulation involves the addition of a quantity of a lithium salt or a multivalent metal salt;
wherein the multivalent metal salt is added to the latex for coagulation in a quantity of 0.5-2.5 wt % with regard to the weight of the core-shell graft copolymer particles present in the latex;
the the core-shell graft copolymer comprises elastomeric core particles and thermoplastic polymeric chains, ≥5.0 wt % and ≤30 wt % of thermoplastic polymeric chains are covalently bound onto the elastomeric core particles, and ≥30.0 wt % and ≤65.0 wt % of the thermoplastic polymeric chains are not covalently bound to the elastomeric core particles, the elastomeric core particles are polybutadiene particles, and the thermoplastic polymer chains are poly(styrene-acrylonitrile) chains; the surfactant is a fatty acid or a salt thereof, or a mixture of fatty acids or salts thereof; and the multivalent metal salt is a salt of an alkaline earth metal.

20. The core-shell graft copolymer of claim 19, wherein the core-shell graft copolymer comprises ≥10.0 wt % and ≤20 wt % of the thermoplastic polymeric chains that are covalently bound onto the elastomeric core particles, and ≥40.0 wt % and ≤55.0 wt % of the thermoplastic polymeric chains are not covalently bound to the elastomeric core particles, with respect to the total weight of the core-shell copolymer.

* * * * *